United States Patent
Moon et al.

(10) Patent No.: US 9,635,535 B2
(45) Date of Patent: Apr. 25, 2017

(54) PROXIMITY MEASUREMENT METHOD AND APPARATUS FOR DEVICE TO DEVICE COMMUNICATION IN MOBILE COMMUNICATION SYSTEM

(71) Applicant: Electronics and Telecommunications Research Institute, Daejeon (KR)

(72) Inventors: Jung Mo Moon, Daejeon (KR); Jee Hyeon Na, Daejeon (KR); Dae Ik Kim, Daejeon (KR); Woo Goo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 275 days.

(21) Appl. No.: 14/097,751

(22) Filed: Dec. 5, 2013

(65) Prior Publication Data
US 2014/0160965 A1 Jun. 12, 2014

(30) Foreign Application Priority Data
Dec. 6, 2012 (KR) ........................ 10-2012-0140785

(51) Int. Cl.
*H04L 5/14* (2006.01)
*H04J 3/00* (2006.01)
*H04W 8/00* (2009.01)

(52) U.S. Cl.
CPC .................... *H04W 8/005* (2013.01)

(58) Field of Classification Search
CPC ......... H04W 8/005; H04W 8/10; H04W 8/14; H04W 16/26
See application file for complete search history.

(56) References Cited

U.S. PATENT DOCUMENTS

| | | | |
|---|---|---|---|
| 2006/0022048 A1* | 2/2006 | Johnson | ................ H04L 69/329 |
| | | | 235/462.1 |
| 2006/0111111 A1* | 5/2006 | Ovadia | ............... H04L 41/0213 |
| | | | 455/439 |
| 2011/0282989 A1* | 11/2011 | Geirhofer | ............. H04W 28/18 |
| | | | 709/224 |

(Continued)

FOREIGN PATENT DOCUMENTS

KR 10-2010-0088752 8/2010

*Primary Examiner* — Faruk Hamza
*Assistant Examiner* — Abu-Sayeed Haque
(74) *Attorney, Agent, or Firm* — Nelson Mullins Riley & Scarborough LLP; Anthony A. Laurentano

(57) ABSTRACT

Disclosed is a proximity measurement method and apparatus for device-to-device (D2D) communication in a mobile communication system. The proximity measurement method may include determining whether a cell identification (ID) is included in a packet received from a gateway, verifying whether the cell ID matches a pre-stored cell ID when the cell ID is included, extracting, from the packet, Internet Protocol addresses of mobile terminals transmitting and receiving the packet when the cell ID matches the pre-stored cell ID, searching for IP addresses matched to the extracted IP addresses based on a proximity list including IP addresses of mobile terminals performing D2D communication, and registering, when the extracted IP addresses are absent in the proximity list, the extracted IP addresses in the proximity list and measuring proximity between the mobile terminals.

17 Claims, 5 Drawing Sheets

(56) References Cited

U.S. PATENT DOCUMENTS

2013/0072216 A1\* 3/2013 Ledlie ................... H04W 4/043
 455/456.1
2013/0331135 A1\* 12/2013 Novak .................... H04W 8/08
 455/500

\* cited by examiner

PROXIMITY MEASUREMENT METHOD AND APPARATUS FOR DEVICE TO DEVICE COMMUNICATION IN MOBILE COMMUNICATION SYSTEM

CROSS-REFERENCE TO RELATED APPLICATION

This application claims priority to and the benefit of Korean Patent Application No. 10-2012-0140785, filed on Dec. 6, 2012, in the Korean Intellectual Property Office, the disclosure of which is incorporated herein by reference.

BACKGROUND

1. Field of the Invention

Exemplary embodiments relate to a proximity measurement method and apparatus for device-to-device (D2D) communication in a mobile communication system to measure proximity for direct communication between devices in the mobile communication system.

2. Description of the Related Art

Recently, with the spread of smart phones and the like, an amount of wireless data usage in a mobile communication system is greatly increasing and an amount of data exchange between mobile terminals is also increasing due to social network applications and the like. To handle the considerably increasing traffic of a mobile communication network, a method of improving a wireless transmission rate, a method of using a radio resource effectively using a small cell such as a femto cell in a macro cell, and the like, are being applied.

However, in a case in which a small cell is used, costs for handling traffic in a mobile communication core network increase greatly due to sharply increasing traffic since a small cell has a structure of accessing a mobile communication core network, and costs for managing a large number of small cells in a mobile communication core network also increase. Accordingly, active studies have been conducted on a wireless backhaul to reduce costs for maintaining and managing small cells, however due to characteristics of a wireless backhaul, high speed packet transmission may cause an issue.

One of the features of resulting traffic with the advent of a social network service is regionality involved in user meetings, for example, friendship, coworkership, and the like. Regionality-based traffic is transmitted via a gateway of a mobile communication core network due to characteristics of mobile communication, and this traffic causes a high load on a transport network between a mobile communication core network and a base station.

An existing traffic handling method in a mobile communication network is incapable of distinguishing regionality-based traffic, and on this account, research has been conducted on methods for handling regionality-based traffic. Recently, as one of the solutions of handling regionality-based traffic, technologies for device-to-device (D2D) communication are being studied.

As one of the technologies for D2D communication, reference may be made to Korean Patent Publication No. 10-2012-0100833, published on Sep. 12, 2012, titled "*method of performing direct communication between terminals and terminal for supporting the same*" in which a resource is commonly allocated to all cells and D2D communication is performed between a first terminal and a second terminal using the common D2D communication resource having fixed size and location.

To enable D2D communication, a process for measuring proximity is required to determine whether devices being communicating with one another are capable of D2D communication, and may be classified into a method of measuring proximity in response to a request from an application program and a method of measuring proximity automatically by internal processing of a mobile communication network. However, packet traffic in a mobile communication network is not managed by independent sessions for each service but is handled by one integrated session within which a plurality of services are used, and for this reason, it is difficult to recognize triggers for D2D communication between mobile communication terminals. To solve this issue, packets routed on a gateway may be all examined at the gateway, however a high load may be applied to the gateway, resulting in reduced efficiency.

Accordingly, there is a demand for a method of measuring proximity between devices without applying a change or load to packet routing and a control protocol of an existing mobile communication core network.

SUMMARY

An aspect of the present invention provides a proximity measurement method and apparatus for device-to-device (D2D) communication in a mobile communication system that may measure proximity between devices without applying a change or load to packet routing and a control protocol of an existing mobile communication core network.

Another aspect of the present invention also provides a proximity measurement method and apparatus for D2D communication in a mobile communication system that may measure proximity between devices of different adjacent cells as well as between devices within one cell.

Still another aspect of the present invention also provides a proximity measurement method and apparatus for D2D communication in a mobile communication system that may reduce a load of the mobile communication system in the communication between devices adjacent to one another.

According to an aspect of the present invention, there is provided a proximity measurement method for D2D communication in a proximity measurement apparatus, the proximity measurement method including determining whether a cell identification (ID) is included in a packet received from a gateway, verifying whether the cell ID matches a pre-stored cell ID when the cell ID is included, extracting, from the packet, Internet Protocol addresses of mobile terminals transmitting and receiving the packet when the cell ID matches the pre-stored cell ID, searching for IP addresses matched to the extracted IP addresses based on a proximity list including IP addresses of mobile terminals performing D2D communication, and registering, when the extracted IP addresses are absent in the proximity list, the extracted IP addresses in the proximity list and measuring proximity between the mobile terminals.

The pre-stored cell ID may include a cell ID of the proximity measurement apparatus and a cell ID of an adjacent base station.

The extracting may include extracting the IP addresses of the mobile terminals from an IP packet in the packet.

The proximity list may include IP addresses of two pairs of mobile terminals on which D2D communication or proximity measurement is in progress.

The searching may include searching for IP addresses of a pair of mobile terminals matched to the extracted IP addresses.

The proximity measurement method may further include, after the measuring of the proximity, activating a delay timer to delay the proximity measurement for a preset period of time when the mobile terminals are in a state of being incapable of D2D communication as a result of measuring the proximity.

The IP addresses of the mobile terminals in the state of being incapable of D2D communication may be deleted from the proximity list when the delay timer expires.

The proximity measurement method may further include, before the determining, generating a tunnel header including the cell ID when the packet is received from the mobile terminals, and adding the tunnel header to the packet and transmitting the packet to the gateway.

The proximity measurement method may further include, after the measuring, routing the packet between the mobile terminals directly based on the measured proximity.

According to another aspect of the present invention, there is provided a proximity measurement apparatus for D2D communication, including an ID verification unit to determine whether a cell ID is included in a packet received from a gateway and to verify whether the cell ID matches a pre-stored cell ID when the cell ID is included, an IP address search unit to extract, from the packet, IP addresses of mobile terminals transmitting and receiving the packet when the cell ID matches the pre-stored cell ID, and to search for IP addresses matched to the extracted IP addresses based on a proximity list including IP addresses of mobile terminals performing D2D communication, and a proximity measurement unit to, when the extracted IP addresses are absent in the proximity list, register the extracted IP addresses in the proximity list and to measure proximity between the mobile terminals.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments are described in detail by referring to the accompanying drawings.

Figure 1:
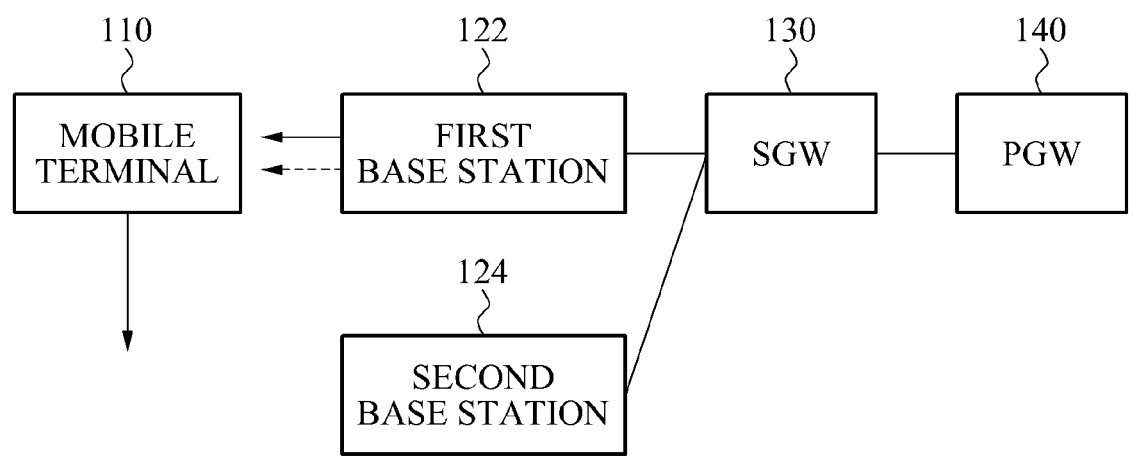
FIG. 1 is a diagram illustrating nodes for transmitting and receiving a packet being delivered during communication between mobile terminals in a mobile communication network.

FIG. 1 is a diagram illustrating nodes for transmitting and receiving a packet being delivered during communication between mobile terminals in a mobile communication network. The following description of nodes making up a packet path in a network structure of 3rd Generation Partnership Project Long Term Evolution (3GPP LTE) is provided for example.

The 3GPP LTE network may include a mobile terminal 110, base stations 122 and 124, a serving gateway (SGW) 130 that functions as an anchor for handover with the base stations 122 and 124, and a packet data network (PDN) gateway (PGW) 140 that functions as an anchor for handover with a non-3GPP network. Here, the base stations 122 and 124 may correspond to an evolved Node B (eNB) that serves as a base station in the LTE network.

For the mobile terminal 110 to use a packet service, a bearer session may be set to deliver a packet between the mobile terminal 110 and the PGW 140, and packet transmission between nodes or layer 2(L2) bridging may be enabled through an identifier set to the session.

The packet transmission using the session identifier has advantages of simplifying a packet transmission function such as handover in a mobile communication network and allowing various network structures between relay nodes, but a drawback of having to deliver a packet transmitted from the mobile terminal 110 to the PDW 140.

Figure 2:
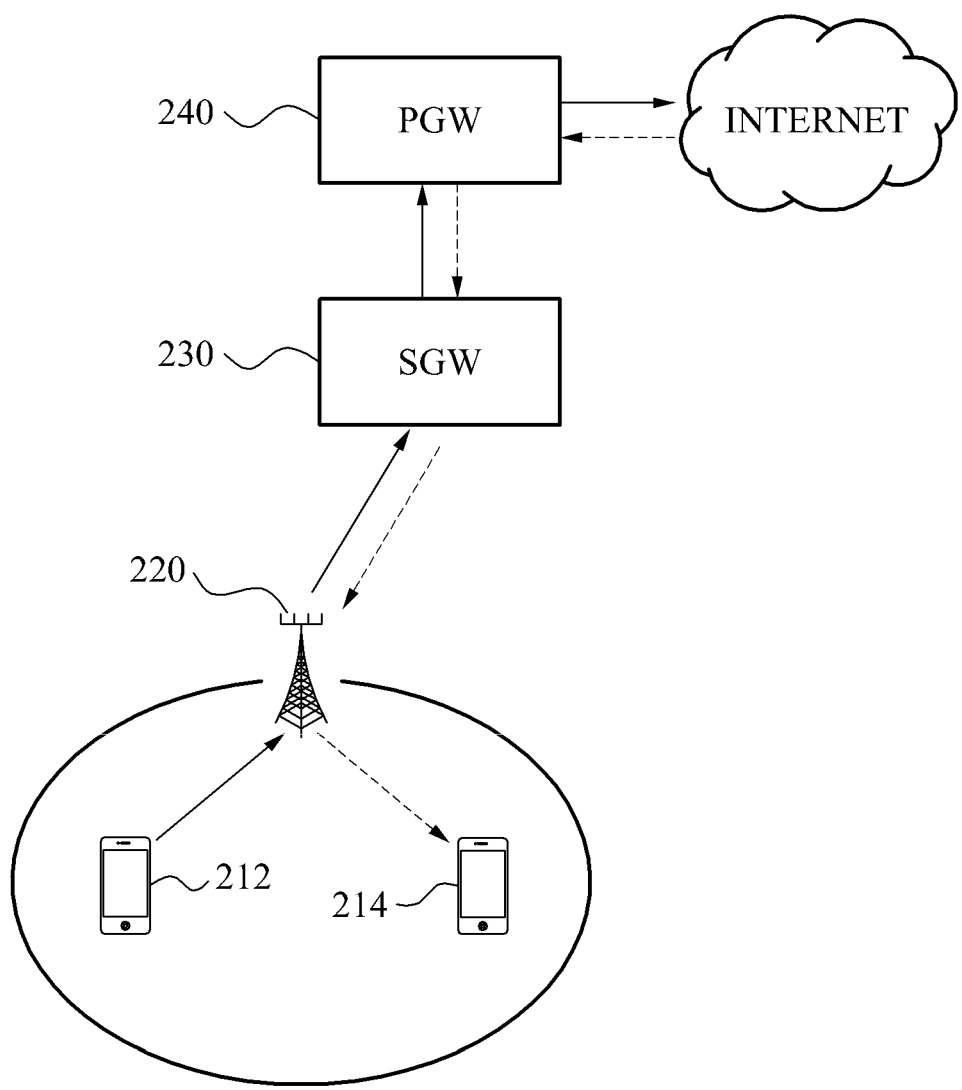
FIG. 2 is a diagram illustrating a packet path in packet transmission between mobile terminals.

FIG. 2 is a diagram illustrating a packet path in packet transmission between mobile terminals. Referring to FIG. 2, a packet path set between a first mobile terminal 212, a second mobile terminal 214, a base station 220, an SGW 230, and a PGW 240 is shown.

As shown in FIG. 2, in the packet transmission between mobile terminals, the packet path may include a packet transmission path between the first mobile terminal 212 and the PGW 240 and a packet transmission path between the second mobile terminal 214 and the PGW 240. The two paths may be generated and deleted independently from one another. For example, when the first mobile terminal 212 and the second mobile terminal 214 intend to communicate with one another, one of the two paths may be first set and the other path may be set, and the two paths may be connected through routing of the PGW 240.

The path for communication between the first mobile terminal 212 and the second mobile terminal 214 may be set independently from other bearers in a case of a special session such as voice, however a packet bearer for mobile communication is generally set through a function for managing services integratedly via one bearer based on a service quality, and thus, communication between mobile terminals may be enabled using the integrated bearer having the same service quality. Due to this feature, the base station 220 and the SGW 230 may be unaware of a final destination to which the packet is forwarded.

Figure 3:
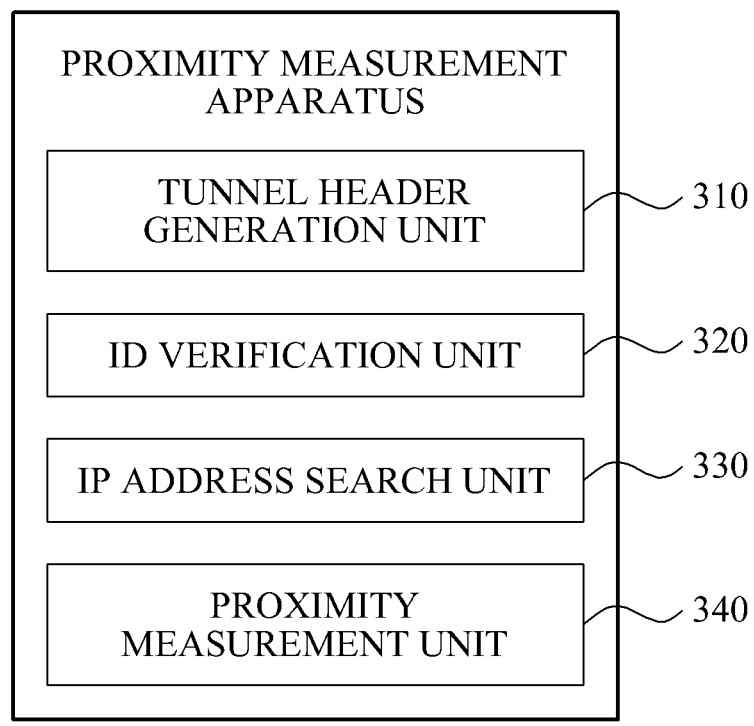
FIG. 3 is a block diagram illustrating a proximity measurement apparatus for D2D communication according to an exemplary embodiment.

FIG. 3 is a block diagram illustrating a proximity measurement apparatus 300 for D2D communication according to an exemplary embodiment.

The proximity measurement apparatus 300 for D2D communication according to an exemplary embodiment may measure proximity using, for example, an automatic measurement method by internal processing of a mobile communication network. For this, the proximity measurement apparatus 300 may include a tunnel header generation unit 310, an identification (ID) verification unit 320, an Internet Protocol (IP) address search unit 330, and a proximity measurement unit 340, as shown in FIG. 3. Here, the proximity measurement apparatus 300 may be included in a base station, or the base station may perform a function of the proximity measurement apparatus 300.

When a packet is received from mobile terminals, the tunnel header generation unit 310 may generate a tunnel header including a cell ID, may add the tunnel header including the cell ID to the packet received from the mobile terminals, and may transmit the packet to a gateway.

When the packet is received from the gateway, the ID verification unit 320 may determine whether the cell ID is included in the received packet. When the cell ID is included in the packet received from the gateway, the ID verification unit 320 may verify whether the cell ID matches a pre-stored cell ID. Here, the pre-stored cell ID may a cell ID of the proximity measurement apparatus 300 and a cell ID of an adjacent base station. For this, although not shown in FIG. 3, the proximity measurement apparatus 300 may include an ID storage unit to store the cell ID of the proximity measurement apparatus 300 and the cell ID of the adjacent base station.

When the cell ID included in the packet received from the gateway is determined to match the pre-stored cell ID as a result of verifying the cell ID by the ID verification unit 320, the IP address search unit 330 may extract, from the packet received from the gateway, IP addresses of the mobile terminals transmitting and receiving the packet, and may search for IP addresses matched to the extracted IP addresses based on a proximity list including IP addresses of mobile terminals performing D2D communication. In this instance, the IP address search unit 330 may extract the IP addresses of the mobile terminals from an IP packet in the packet received from the gateway.

Here, the proximity list may include information associated with IP addresses of two pairs of mobile terminals on which D2D communication or proximity measurement is in progress as shown in Table 1 below.

TABLE 1

| UE IP address | UE IP address |
|---|---|
| XXX.XXX.XXX.XXX | XXX.XXX.XXX.OOO |
| XXX.XXX.OOO.OOO | XXX.XXX.OOO.XXX |
| XXX.OOO.OOO.OOO | XXX.OOO.XXX.OOO |

The two pairs of mobile terminals in the proximity list of Table 1 may be in a D2D communication state because the mobile terminals are adjacent to one another, or may be a proximity inspection phase for D2D communication.

The IP address search unit 330 may search for mobile terminals having a pair of IP addresses matched to the IP addresses extracted from the IP packet based on the proximity list.

When the IP addresses extracted through the IP address search unit 330 are absent in the proximity list, the proximity measurement unit 340 may register, in the proximity list, the IP addresses extracted from the IP packet in the packet received from the gateway, and may measure proximity of the corresponding mobile terminals. Also, when the mobile terminals are incapable of D2D communication as a result of measuring the proximity, the proximity measurement unit 340 may prevent the proximity measurement by activating a delay timer to delay the proximity measurement for a preset period of time, to reduce a load caused by the proximity measurement. In this instance, when a distance between the two pairs of mobile terminals in the D2D communication state increases, when the D2D communication is disconnected for another reason, or as the preset period of time set in the delay timer passes, the proximity measurement unit 340 may delete, from the proximity list, the IP addresses of the mobile terminals in a state of being incapable of D2D communication.

The proximity measurement apparatus 300 may reduce a load of the mobile communication core network by routing the packet between the mobile terminals directly using the measured proximity of the mobile terminals.

Figure 4:
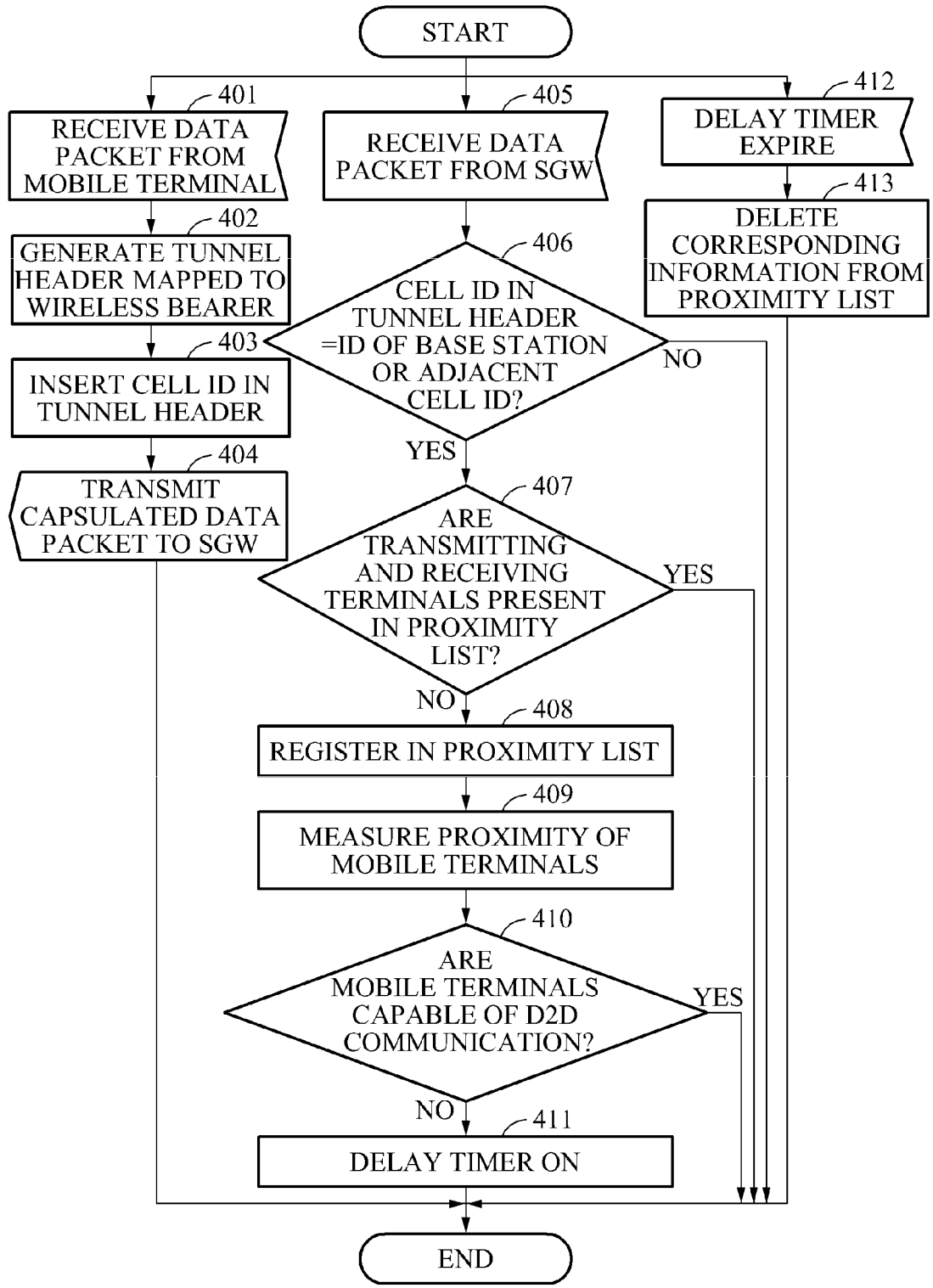
FIG. 4 is a flowchart illustrating a process of processing a data packet for measuring proximity between mobile terminals according to an exemplary embodiment.

FIG. 4 is a flowchart illustrating a process of processing a data packet for measuring proximity between mobile terminals according to an exemplary embodiment. Hereinafter, a case in which a base station functions as a proximity measurement apparatus is described as an example.

When a base station receives a data packet from a mobile terminal in operation 401, the base station may generate a tunnel header including a tunnel ID to tunnel the corresponding data packet to an SGW by referring to context of a session corresponding to a wireless bearer ID in operation 402. In operation 403, the base station may add a cell ID of the base station to the tunnel header. A process of adding the tunnel header to a front part of the data packet may refer to capsulation. In operation 404, the generated capsulated data packet may be transmitted to the SGW hierarchically higher than the base station.

When the base station receives the tunneled packet from the hierarchically higher SGW in operation 405, the base station may determine whether the cell ID is included in the tunnel header. When the cell ID is present in the tunnel header, the base station may verify whether a value of the cell ID corresponds to a cell ID of the base station or an ID of an adjacent cell in operation 406. In this instance, the base station may be already aware of information associated with cell IDs of adjacent cells by a network operator.

When the cell ID of the received tunneled packet corresponds to the cell ID of the base station or the ID of the adjacent cell, the base station may extract transmitter/receiver IP addresses of an IP packet of the tunneled packet, and may determine whether mobile terminals having the transmitter/receiver IP addresses are present in a proximity list in operation 407. When this pair is absent in the list, the base station may register the IP addresses of this pair in the proximity list in operation 408, and may start to measure proximity between the corresponding two mobile terminals in operation 409.

When the two mobile terminals are not in a state of supporting D2D communication as a result of measuring the proximity in operation 410, the base station may activate a delay timer, thereby preventing proximity measurement during delay to reduce a load of the base station in operation 411. In this case, when a timer for the corresponding IP address pair expires in operation 412, the base station may delete the pair from the proximity list in operation 413, and since then, when data communication is established between the two mobile terminals, may perform the proximity measurement again.

A function of the hierarchically higher gateway as a mobile communication core network is as follows. The SGW may tunnel the corresponding data packet to a PGW by referring to session context corresponding to the ID of the tunnel header of the received packet. In this instance, as a transmitter base station ID received from the base station, a received value may be used. For the packet received from the SGW, the PGW may inspect an IP header as preprocessing for IP routing, and if a routing path of the packet received from the SGW is routed to the mobile communication network again, may configure a tunnel header by replicating the received transmitter base station ID and may transmit the packet to the hierarchically lower SGW. However, in a case in which the IP packet is received from an external network, the PGW may configure a tunnel header without any information in a state of the transmitter base station ID part being reserved, and may transmit the packet to the hierarchically lower SGW.

Figure 5:
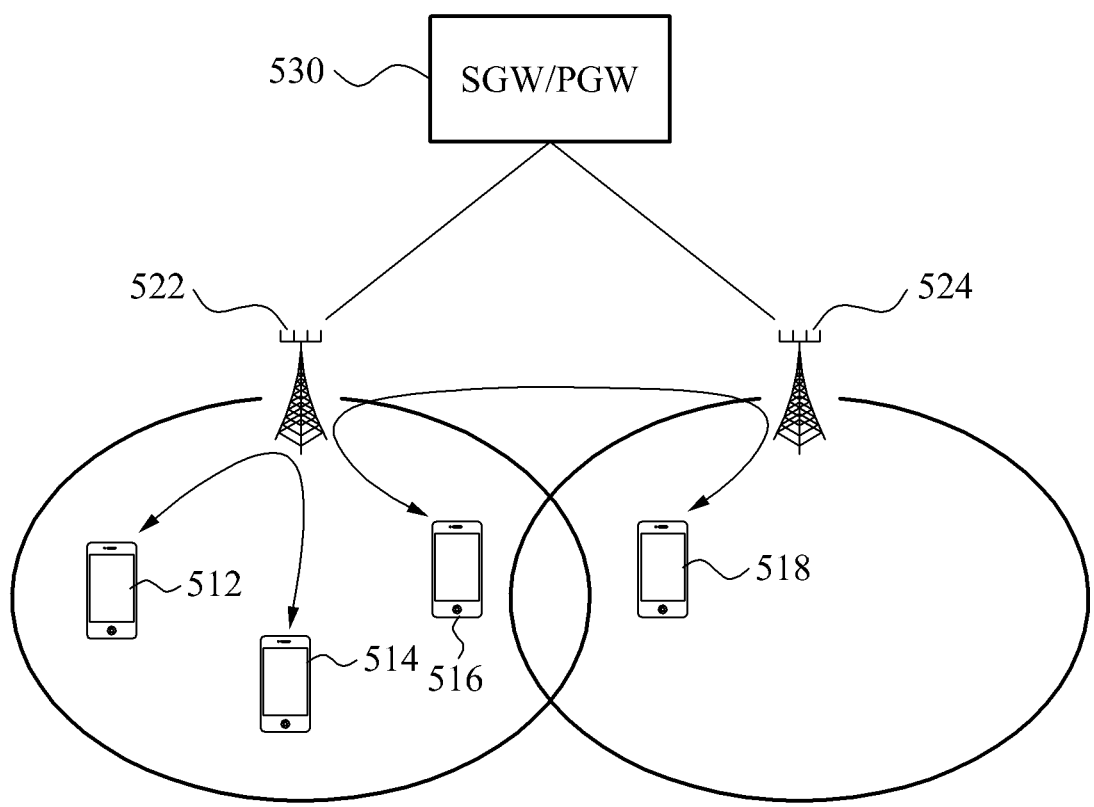
FIG. 5 is a diagram illustrating an example of D2D communication between mobile terminals through a base station according to an exemplary embodiment.

FIG. 5 is a diagram illustrating an example of D2D communication between mobile terminals through a base station according to an exemplary embodiment. In FIG. 5, a plurality of mobile terminals 512, 514, 516, and 518, base stations 522 and 524, and a gateway 530 are shown.

In accordance with a proximity measurement method according to an exemplary embodiment, proximity between the mobile terminals 512 and 514 and between the mobile terminals 516 and 518 may be measured. Accordingly, when the mobile terminals 512, 514, 516, and 518 make communications in the same cell or across adjacent cells, the base station 522 may perform direct routing in the same cell or may perform direct routing with the base station 524, to reduce a load of a mobile communication core network.

According to the exemplary embodiments, proximity between the mobile terminals may be measured without applying a change or load to packet routing and a control protocol of an existing mobile communication core network and, by measuring proximity using the cell ID, IP addresses of the mobile terminal, and the proximity list.

Because of determining the proximity using the proximity list, the proximity may be measured between devices of different adjacent cells as well as between devices within one cell.

By routing the packet between the mobile terminals based on the measured proximity, applicability may be expanded to communication between adjacent mobile terminals as well as D2D communication so that a load of the mobile communication network may be reduced.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A proximity measurement method for device-to-device (D2D) communication in a proximity measurement apparatus, the proximity measurement method comprising:
determining whether a cell identification (ID) is included in a packet received from a gateway;
verifying whether the cell ID matches a pre-stored cell ID when the cell ID is included;
extracting, from the packet, Internet Protocol addresses of mobile terminals transmitting and receiving the packet when the cell ID matches the pre-stored cell ID;
searching for IP addresses matched to the extracted IP addresses based on a proximity list including IP addresses of mobile terminals performing D2D communication; and
registering, when the extracted IP addresses are absent in the proximity list, the extracted IP addresses in the proximity list and measuring proximity between the mobile terminals.

2. The proximity measurement method of claim 1, wherein the pre-stored cell ID includes a cell ID of the proximity measurement apparatus and a cell ID of an adjacent base station.

3. The proximity measurement method of claim 1, wherein the extracting comprises extracting the IP addresses of the mobile terminals from an IP packet in the packet.

4. The proximity measurement method of claim 1, wherein the proximity list includes IP addresses of two pairs of mobile terminals on which D2D communication or proximity measurement is in progress.

5. The proximity measurement method of claim 4, wherein the searching comprises searching for IP addresses of a pair of mobile terminals matched to the extracted IP addresses.

6. The proximity measurement method of claim 1, further comprising:
after the measuring of the proximity,
activating a delay timer to delay the proximity measurement for a preset period of time when the mobile terminals are in a state of being incapable of D2D communication as a result of measuring the proximity.

7. The proximity measurement method of claim 6, wherein the IP addresses of the mobile terminals in the state of being incapable of D2D communication are deleted from the proximity list when the delay timer expires.

8. The proximity measurement method of claim 1, further comprising:
before the determining,
generating a tunnel header including the cell ID when the packet is received from the mobile terminals; and
adding the tunnel header to the packet and transmitting the packet to the gateway.

9. The proximity measurement method of claim 1, further comprising:
after the measuring,
routing the packet between the mobile terminals directly based on the measured proximity.

10. A proximity measurement apparatus included in a base station for device-to-device (D2D) communication, comprising:
a processor configured to:
determine whether a cell ID is included in a packet received from a gateway and verify whether the cell ID matches a pre-stored cell ID when the cell ID is included;
extract from the packet, IP addresses of mobile terminals transmitting and receiving the packet when the cell ID matches the pre-stored cell ID and to search for IP addresses matched to the extracted IP addresses based on a proximity list including IP addresses of mobile terminals performing D2D communication; and
register when the extracted IP addresses are absent in the proximity list, the extracted IP addresses in the proximity list and to measure proximity between the mobile terminals.

11. The proximity measurement apparatus of claim 10, wherein the processor is further configured to:
store a cell ID of the proximity measurement apparatus and a cell ID of an adjacent base station.

12. The proximity measurement apparatus of claim 10, wherein the processor extracts the IP addresses of the mobile terminals from an IP packet in the packet, and searches for the IP addresses matched to the extracted IP addresses based on the proximity list including IP addresses of two pairs of mobile terminals on which D2D communication or proximity measurement is in progress.

13. The proximity measurement apparatus of claim 12, wherein the processor searches for IP addresses of a pair of mobile terminals matched to the extracted IP addresses based on the proximity list.

14. The proximity measurement apparatus of claim 10, wherein the processor activates a delay timer to delay the proximity measurement for a preset period of time when the mobile terminals are in a state of being incapable of D2D communication as a result of measuring the proximity.

15. The proximity measurement apparatus of claim 14, wherein the processor deletes, from the proximity list, the IP addresses of the mobile terminals in the state of being incapable of D2D communication as the preset period of time passes.

16. The proximity measurement apparatus of claim 10, wherein the processor is further configured to:
- generate a tunnel header including the cell ID when the packet is received from the mobile terminals, to add the tunnel header to the packet, and to transmit the packet to the gateway.

17. The proximity measurement apparatus of claim 10, wherein the processor is further configured to:
- route the packet between the mobile terminals directly based on the measured proximity.

\* \* \* \* \*